(12) United States Patent
Qiu et al.

(10) Patent No.: US 11,723,414 B2
(45) Date of Patent: Aug. 15, 2023

(54) CONTROL METHOD AND DEVICE, AND ELECTRONIC CIGARETTE

(71) Applicant: JOYETECH EUROPE HOLDING GMBH, Zug (CH)

(72) Inventors: Weihua Qiu, Changzhou (CN); Zhongzhou Wang, Changzhou (CN)

(73) Assignee: JOYETECH EUROPE HOLDING GMBH, Zug (CH)

( * ) Notice: Subject to any disclaimer, the term of this patent is extended or adjusted under 35 U.S.C. 154(b) by 416 days.

(21) Appl. No.: 16/955,763

(22) PCT Filed: Nov. 26, 2018

(86) PCT No.: PCT/CN2018/117405
§ 371 (c)(1),
(2) Date: Jun. 18, 2020

(87) PCT Pub. No.: WO2019/120043
PCT Pub. Date: Jun. 27, 2019

(65) Prior Publication Data
US 2021/0007402 A1    Jan. 14, 2021

(30) Foreign Application Priority Data

Dec. 18, 2017  (CN) .......................... 201711366346.3

(51) Int. Cl.
*A24F 47/00*  (2020.01)
*A24F 40/53*  (2020.01)
(Continued)

(52) U.S. Cl.
CPC .............. *A24F 40/53* (2020.01); *A24F 40/57* (2020.01); *A24F 40/60* (2020.01); *G05B 19/042* (2013.01);
(Continued)

(58) Field of Classification Search
CPC ................................. A24F 40/53; A24F 40/60
See application file for complete search history.

(56) References Cited

U.S. PATENT DOCUMENTS

2013/0104916 A1   5/2013  Bellinger et al.
2013/0319435 A1*  12/2013  Flick ................... A61M 11/041
                                                      219/490
(Continued)

FOREIGN PATENT DOCUMENTS

CN         203873007 U       10/2014
CN         204579886 U        8/2015
(Continued)

*Primary Examiner* — Eric Yaary
(74) *Attorney, Agent, or Firm* — Cheng-Ju Chiang

(57) ABSTRACT

A control method and device, and an electronic cigarette. The method includes: obtaining the maximum output power during the secure output of an atomizer connected to a body; detecting whether the currently-set target power of the atomizer is higher than the maximum output power; and if the target power is higher than the maximum output power, executing a preset operation, the preset operation including at least one of controlling, the atomizer to output at power lower than or equal to the maximum output power and displaying a first reminder message, according to a cigarette lighting signal. The method resolves the problem that dry burning would easily occur in an atomizer, and has the function of protecting the atomizer and preventing the shortening of the life of a heating component caused by the burning of the heating component due to high power output of the atomizer.

11 Claims, 1 Drawing Sheet

(51) Int. Cl.
*A24F 40/57* (2020.01)
*A24F 40/60* (2020.01)
*G05B 19/042* (2006.01)
*A24F 40/10* (2020.01)

(52) U.S. Cl.
CPC ...... *A24F 40/10* (2020.01); *G05B 2219/2639* (2013.01)

(56) References Cited

U.S. PATENT DOCUMENTS

| | | |
|---|---|---|
| 2014/0014126 A1 | 1/2014 | Peleg et al. |
| 2016/0192706 A1* | 7/2016 | Kananen .................. H05B 3/16 128/202.21 |
| 2017/0224016 A1* | 8/2017 | Reevell .................... H05B 3/04 |
| 2019/0217028 A1* | 7/2019 | Nakano ................. A24F 40/485 |
| 2021/0186097 A1* | 6/2021 | Schmidt ............... A61M 11/042 |

FOREIGN PATENT DOCUMENTS

| | | |
|---|---|---|
| CN | 105077595 A | 11/2015 |
| CN | 106136323 A | 11/2016 |
| CN | 106343617 A | 1/2017 |
| CN | 108391852 A | 8/2018 |
| WO | 2015/192084 A1 | 12/2015 |

* cited by examiner

CONTROL METHOD AND DEVICE, AND ELECTRONIC CIGARETTE

CROSS REFERENCE TO RELATED APPLICATION

The present application is a 35 U.S.C. § 371 National Phase conversion of International (PCT) Patent Application No. PCT/CN2018/117405, filed on Nov. 26, 2018, which is based on and claims priority of Chinese patent application No. 201711366346.3, filed on Dec. 18, 2017. The entire disclosure of the above-identified application is hereby incorporated by reference herein and made a part of this specification.

TECHNICAL FIELD

The invention relates to the field of computer technology, in particular to a control method, device and electronic cigarette.

BACKGROUND

The electronic cigarette is an electronic product simulating a cigarette, which can be atomized by controlling the internal atomizer to generate smoke, and the smoke can be sucked into the body from the cigarette holder by a user of the electronic cigarette so as to achieve the purpose of simulating smoking.

With the development of e-cigarette technology, the e-cigarettes currently on the market have the function of controlling the atomizer to output large power to generate large smoke in order to meet the user's demand for large smoke. However, in the process of the electronic cigarette controlling the atomizer output at a larger power, the atomizer is prone to dry burning.

SUMMARY

In order to solve the problem that the atomizer is prone to dry burning in the prior art, embodiments of the present invention provide a control method, device, and electronic cigarette. The technical solution is as follows:

In a first aspect, a control method is provided, the method including:

obtaining the maximum output power of an atomizer connected to a body during a secure output;

detecting whether a currently-set target power of the atomizer is higher than the maximum output power;

when the target power is higher than the maximum output power, executing a preset operation, the preset operation including at least one of controlling the atomizer to output at power less than or equal to the maximum output power according to a cigarette lighting signal, and displaying a first reminder message.

Optionally, the obtaining the maximum output power of an atomizer connected to a body during a secure output includes:

obtaining resistance value information of the atomizer;

obtaining the maximum output power of the atomizer during a secure output according to the resistance value information.

Optionally, the obtaining the maximum output power of the atomizer during a secure output according to the resistance value information includes:

querying the maximum output power corresponding to the resistance value information, according to a preset correspondence relationship between the resistance value and the maximum output power.

Optionally, the method further includes:

receiving an adjustment instruction for adjusting the maximum output power corresponding to target resistance value;

adjusting the maximum output power corresponding to the target resistance value of the preset correspondence relationship according to the adjustment instruction.

Optionally, when the power information of the atomizer is less than or equal to the maximum output power, controlling the atomizer output at the target power according to the cigarette lighting signal.

Optionally, the executing a preset operation includes:

displaying the first reminder message, the first reminder message used to prompt whether the atomizer outputs at the target power;

when the confirmation output condition is satisfied, the atomizer is controlled to output at the target power according to the cigarette lighting signal.

Optionally, the executing a preset operation includes:

displaying the first reminder message, the first reminder message used to prompt whether the atomizer outputs at the target power;

when receiving a confirmation signal, the atomizer controlled to output at a power less than or equal to the maximum output power according to the cigarette lighting signal, and the confirmation signal generated when the atomizer stops outputting at the target power is confirmed.

Optionally, the controlling the atomizer to output at power less than or equal to the maximum output power according to the cigarette lighting signal includes:

obtaining output power inputted by the user, and controlling the atomizer to output according to the output power inputted by the user according to the cigarette lighting signal;

or, obtain the recommended output power, and controlling the atomizer output at the recommended output power according to the cigarette lighting signal, and the recommended output power determined according to the historical output power of the electronic cigarette;

or, when the cigarette lighting signal is received, the atomizer controlled to stop working.

Optionally, the method further includes:

when the liquid level detector detects that the liquid level value of the liquid in the atomizer is lower than a preset threshold, reducing the output power of the atomizer according to the liquid level value.

Optionally, the method further includes:

obtaining the temperature of the heating component in the atomizer, and determining the consumption rate of the liquid in the atomizer according to the temperature of the heating component;

when the consumption rate is greater than the maximum liquid absorption rate of the liquid-absorbing member in the atomizer, reducing the output power of the atomizer or controlling the atomizer to stop working.

Optionally, the method further includes:

when the liquid level detector detects that the liquid level value of the liquid in the atomizer is lower than a preset threshold, determining the consumption rate of the liquid in the atomizer according to the output power of the atomizer;

calculating safe working duration based on the liquid level value and the consumption rate, and displaying a second reminder message carrying the safe working duration.

Optionally, before executing a preset operation, the method further includes:

receiving a setting instruction for setting the reminding mode of the first reminder message;

the execution a preset operation includes:

displaying the first reminder message according to the reminder mode set by the setting instruction.

In a second aspect, a control device is provided, the control device includes:

a memory and a processor;

at least one program instruction is stored in the memory;

the processor implements the control method according to the first aspect and any one embodiment of the first aspect by loading and executing the at least one program instruction.

According to a third aspect, there is provided an electronic cigarette including the control device according to the second aspect.

According to a fourth aspect, a computer storage medium is provided, where at least one program instruction is stored in the computer storage medium, and the at least one program instruction is loaded and executed by a processor to implement the first aspect and any one embodiment of the first aspect.

The beneficial effects brought by the technical solutions provided by the embodiments of the present invention are:

by obtaining the maximum output power of the atomizer connected to the body during the secure output; detecting whether the currently-set target power of the atomizer is higher than the maximum output power; when the target power is higher than the maximum output power, executing a preset operation, the preset operation includes at least one of controlling the atomizer to output at power less than or equal to the maximum output power according to the cigarette lighting signal, and displaying the first reminder message. Solve the problem that the atomizer in the related art is prone to dry burning, and protect the atomizer, prevent the high power output of the atomizer from burning the heating component in the atomizer, and reduce the life of the heating component; because the dry burning of the atomizer is avoided, the effect of ensuring the smoking taste of the user is achieved.

BRIEF DESCRIPTION OF THE DRAWINGS

In order to more clearly explain the technical solutions in the embodiments of the present invention, the drawings required in the description of the embodiments will be briefly introduced below. Obviously, the drawings in the following description are only some embodiments of the present invention. For those of ordinary skill in the art, without paying any creative work, other drawings can be obtained based on these drawings.

DETAILED DESCRIPTION OF PREFERRED EMBODIMENTS

To make the objectives, technical solutions, and advantages of the present invention clearer, the following describes the embodiments of the present invention in further detail with reference to the accompanying drawings. The "electronic devices" mentioned in the article can include smartphones, tablets, smart TVs, e-book readers, MP3 players (Moving Picture Experts Group Audio Layer III, Motion Picture Experts Compression Standard Audio Layer 3), MP4 (Moving Picture Experts Group Audio Layer IV, motion picture expert compression standard audio layer 4) Players, laptops and desktop computers, etc.

In the method provided by the embodiment of the present invention, the execution subject of each step may be a device capable of loading an atomizer, such as an electronic cigarette. For ease of description, in each of the following method embodiments, only the execution body of each step is taken as an example for illustration, but this does not constitute a limitation.

Figure 1:
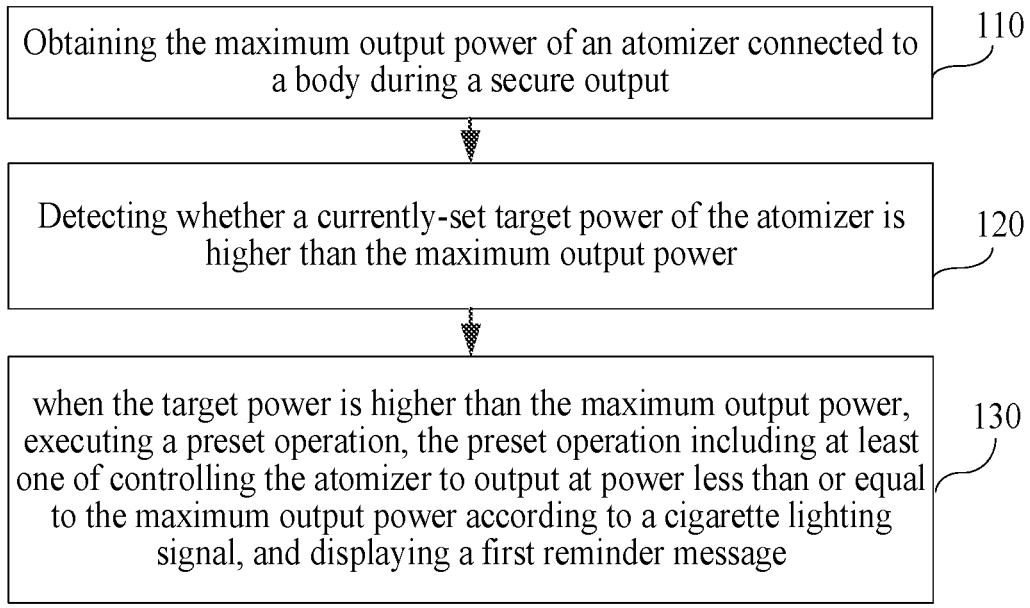
FIG. 1 is a method flowchart of a control method provided in an embodiment of the present invention.

Please refer to FIG. 1, which shows a flowchart of a control method provided by an embodiment of the present invention. The control method may include the following steps.

Step 110: Obtaining the maximum output power of an atomizer connected to a body during a secure output.

Step 120: Detecting whether a currently-set target power of the atomizer is higher than the maximum output power.

Step 130, when the target power is higher than the maximum output power, executing a preset operation, the preset operation including at least one of controlling the atomizer to output at power less than or equal to the maximum output power according to a cigarette lighting signal, and displaying a first reminder message.

In summary, the method provided by the embodiment of the present invention obtains the maximum output power of the atomizer connected to the body during a secure output; detects whether the currently-set target power of the atomizer is higher than the maximum output power; when the target power is higher than the maximum output power, executes a preset operation. The preset operation includes at least one of controlling the atomizer to output at power output less than or equal to the maximum output power according to the cigarette lighting signal, and displaying the first reminder message. Solve the problem that the atomizer in the related art is prone to dry burning, and protect the atomizer, prevent the high-power output of the atomizer from burning the heating component in the atomizer, and reduce the life of the heating component; because the dry burning of the atomizer is avoided, the effect of ensuring the smoking taste of the user is achieved.

Figure 2:
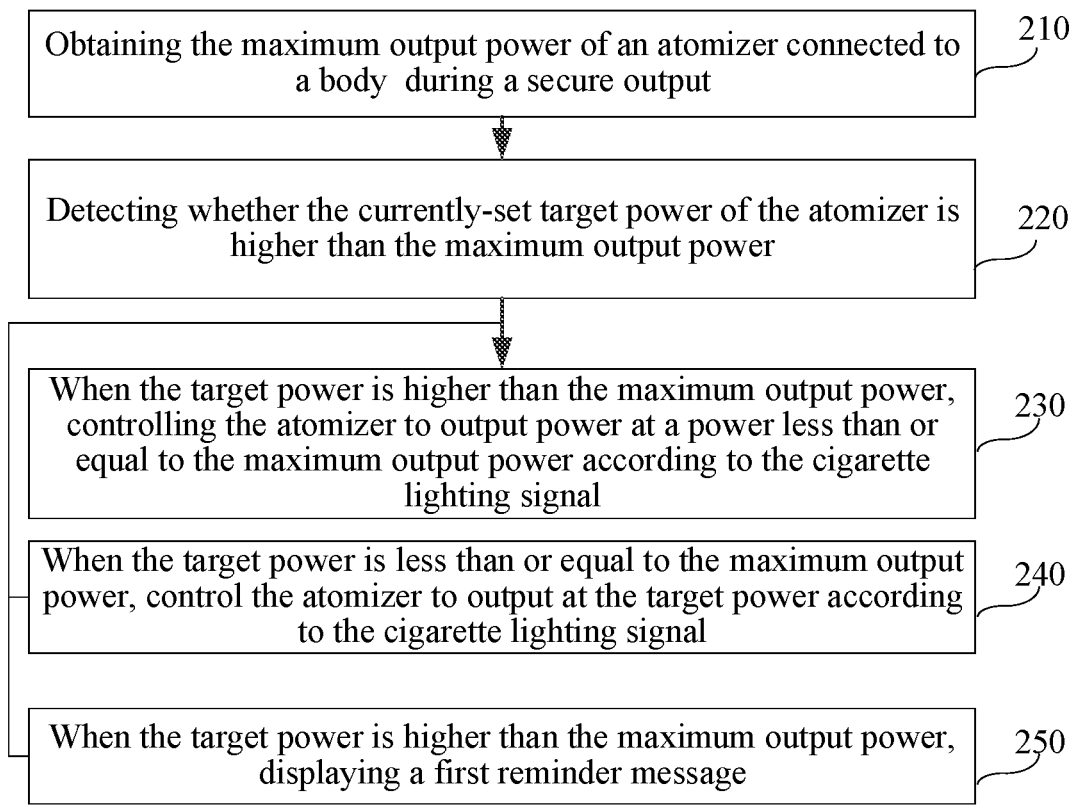
FIG. 2 is a method flowchart of a control method provided in another embodiment of the present invention.

Please refer to FIG. 2, which shows a flowchart of a control method provided by another embodiment of the present invention. The control method may include the following steps.

Step 210: Obtaining the maximum output power of an atomizer connected to a body during a secure output.

The step 210 can be implemented in the following ways:

First, obtaining the device information of the atomizer, wherein the device information includes at least one of the device model and the device identification; and to obtain the maximum output power of the atomizer during the secure output according to the device information.

Among them, the realization of obtaining the device information of the atomizer can be as follows: 1. obtain the device information inputted by the user; 2. when the atomizer is installed in the body of the electronic cigarette, the data communication port of the processor in the atomizer is electrically connected to the processor of the electronic cigarette; the processor in the atomizer sends locally stored device information to the processor in the electronic cigarette.

After obtaining the device information of the atomizer, the electronic cigarette can query the maximum output power corresponding to the device information locally, or query the maximum output power corresponding to the device information from the server. The electronic cigarette and the server can store the correspondence relationship between the device information of each atomizer on the market and the maximum output power when the atomizer is during the secure output. The correspondence relationship in the electronic cigarette may be set by the user, or may be the system default.

Second, obtaining the resistance value information of the atomizer, and obtaining the maximum output power of the atomizer during a secure output according to the resistance value information.

Wherein, the realization of obtaining the resistance value information of the atomizer may be:

1. After the atomizer is installed on the body of the electronic cigarette, the electronic cigarette detects the resistance value of the atomizer to obtain the resistance value information of the atomizer.

2. When the atomizer is installed in the body of the electronic cigarette, the data communication port of the processor in the atomizer is electrically connected to the processor of the electronic cigarette; the processor in the atomizer sends its resistance value information stored locally to the processor inside the e-cigarette. The resistance value information mentioned here can be a resistance value or a range of resistance values; when the resistance value information is a resistance value, the resistance value information can be the resistance value of the atomizer or the atomizing core in the atomizer; In the case where the resistance value information is the resistance value range, the resistance value information may be the change range of the resistance value of the atomizer or the atomizing core in the atomizer during the operation of the atomizer.

3. Obtain the resistance value information inputted by the user in the electronic cigarette. For example, the atomizer manufacturer can indicate the resistance value of the atomizer on the atomizer it produces; when the electronic cigarette detects that the atomizer is installed on the body, it is displayed on the display for input An input box for the resistance value information of the atomizer; to obtain the resistance value information entered in the input box.

4. The electronic cigarette receives the resistance value information sent by the electronic device. For example, the electronic device may be installed with an application program for managing the electronic cigarette. The user may input resistance value information of the atomizer in the application program, and the electronic device sends the resistance value information to the electronic cigarette.

Among them, the electronic device and the electronic cigarette can communicate through wireless communication technologies such as Bluetooth technology, WIFI (wireless fidelity, wireless fidelity) direct connection technology, etc., and can also communicate through a data connection line. This embodiment will not repeat them one by one.

After obtaining the resistance value information of the atomizer connected to the electronic cigarette, the electronic cigarette can query the maximum output power corresponding to the resistance value information of the atomizer according to the preset correspondence relationship between the resistance value and the maximum output power, specifically, the maximum output power of the atomizer during secure output can be obtained in the following ways:

1. The correspondence relationship between the resistance value of the atomizer and the output power can be stored in the electronic cigarette in advance, and the minimum value of the output power corresponding to the resistance value information is determined as the maximum output power when the atomizer is in secure output. The correspondence relationship may be a correspondence relationship table or a correspondence relationship curve between the resistance value of the atomizer and the output power.

2. The correspondence relationship between the resistance range of the atomizer and the output power can be stored in the electronic cigarette in advance, and the output power corresponding to the resistance value information is determined as the maximum output power when the atomizer is in secure output.

The specific implementation may be: obtaining the maximum value in the resistance value information, determining the output power corresponding to the range of the maximum value, and determining the output power as the maximum output power when the atomizer is in secure output.

Wherein, the preset correspondence relationship may be a default correspondence relationship in the electronic cigarette, or may be a correspondence relationship preset by the user, which will not be repeated here. In addition, for the above-mentioned preset correspondence, the user can make changes according to requirements. That is, the control method may further include the following steps:

First, receiving an adjustment instruction for adjust the maximum output power corresponding to the target resistance value.

Second, according to the adjustment instruction, adjusting the maximum output power corresponding to the target resistance value of the preset correspondence relationship.

The adjustment instruction may be an instruction applied by the user in the electronic cigarette, or an instruction applied through an external electronic device, which is not limited.

Step 220: Detecting whether the currently-set target power of the atomizer is higher than the maximum output power.

After step 220 is performed, step 230 or step 240 or step 250 is performed.

Step 230: When the target power is higher than the maximum output power, controlling the atomizer to output power at a power less than or equal to the maximum output power according to the cigarette lighting signal.

The cigarette lighting signal may be a pressing signal generated when a user presses the key on the electronic cigarette after the electronic cigarette is turned on. The cigarette lighting signal may also be an airflow signal detected by an airflow sensor. The cigarette lighting signal may also be a voice control signal. The cigarette lighting signal is not specifically limited.

It should be noted that the airway where the airflow sensor is located is connected to the mouthpiece of the electronic cigarette. When the user smokes through the mouthpiece of the electronic cigarette, since the airflow sensor is located in the airway connected to the mouthpiece, the airflow sensor can detect the airway signal.

The target power involved in this step 230 may be set by the user, or may be a fixed value stored in the electronic cigarette. In step 230, controlling the atomizer according to the cigarette lighting signal to output power less than or equal to the maximum output power can be achieved in the following ways:

First, when receiving the cigarette lighting signal, controlling the atomizer to stop working. In other words, when the electronic cigarette receives the cigarette lighting signal, it will not control the heating component in the atomizer to generate heat to perform the atomization work according to the cigarette lighting signal.

Second, obtaining a recommended output power, and controlling the atomizer output at the recommended output power according to the cigarette lighting signal. The recommended output power is determined according to the historical output power of the atomizer.

Electronic cigarettes can obtain the recommended output power in the following ways:

1. Obtain multiple historical output powers of the electronic cigarette or the atomizer, calculate an average value of the multiple historical output powers, and determine the average value as the recommended output power.

2. Obtain the maximum output power at the secure output of the atomizer, and multiply the maximum output power by a preset proportional coefficient to obtain the recommended output power. Among them, the scale factor can be set by the developer, or can be customized by the user, for example, the developer can set the ratio of 0.85.

3. Obtain the maximum output power of the atomizer during the secure output as the recommended output power.

It should be noted that the embodiment of the present invention only schematically illustrates how to obtain the recommended output power in the above three ways. In actual implementation, how to obtain the recommended output power can also be achieved through other methods, for example, obtaining the output power of the e-cigarette last used and not higher than this maximum output power is regarded as the recommended output power. Therefore, in this embodiment of the present invention, other implementation manners of how to obtain the recommended output power are not described one by one.

Step 240: When the target power is less than or equal to the maximum output power, control the atomizer to output at the target power according to the cigarette lighting signal.

Taking the electronic cigarette in power mode as an example, the electronic cigarette can control the atomizer to work according to a preset output power. When its target power is less than or equal to the maximum output power, the electronic cigarette controls the atomizer to output at the target power according to the cigarette lighting signal.

Taking the electronic cigarette in the temperature control mode as an example, the electronic cigarette can control the temperature of the heating component inside the atomizer to be close to or equal to the preset temperature when the atomizer is working. When the target power of the electronic cigarette is less than or equal to the maximum output power, and the temperature of the heating component does not reach the preset temperature, the atomizer is controlled to output according to the target power according to the cigarette lighting signal.

Step 250: When the target power is higher than the maximum output power, displaying a first reminder message.

Optionally, the first reminder message may be used to remind the user that the currently-set target power is higher than the maximum output power of the atomizer during the secure output. The reminding method of the first reminder message can be set by the user, that is, the electronic cigarette can receive a setting instruction for setting the reminding method of the first reminder message, and display the first reminder message according to the reminding method set by the setting instruction. The implementation manner of displaying the first reminder message may include the following:

First, the electronic cigarette displays the prompt message in the text on its display module. The display module may be a display screen.

Second, the electronic cigarette can voice broadcast the first reminder message.

Third, the electronic cigarette can control the internal alarm device (for example, buzzer) to alarm.

Fourth, the electronic cigarette controls the vibration of its internal vibrator to drive the electronic cigarette body to vibrate.

In one example, after step 220 is performed, step 230 and step 250 may be performed. The implementation of step 230 is that when the e-cigarette receives the cigarette lighting signal and the atomizer stops working, the first reminder message is used to prompt the user that the atomizer stops working; In the case that the atomizer outputs power according to the maximum output power or less, the first reminder message is used to prompt the user that the output power of the atomizer has been lowered.

In summary, the method provided by the embodiment of the present invention obtains the maximum output power of the atomizer connected to the body during the secure output; detects whether the currently-set target power of the atomizer is higher than the maximum output power; when the target power is higher than the maximum output power, executing a preset operation, the preset operation includes at least one of controlling the atomizer to output at power less than or equal to the maximum output power according to the cigarette lighting signal, and displaying the first reminder message. Solve the problem that the atomizer in the related art is prone to dry burning, and protect the atomizer, prevent the high power output of the atomizer from burning the heating component in the atomizer, and reduce the life of the heating component; because the dry burning of the atomizer is avoided, the effect of ensuring the smoking taste of the user is achieved.

In one example, the first reminder message involved in step 250 is used to prompt the user to confirm whether to control the atomizer to output according to the target power. For example, the electronic cigarette may display the first reminder message, a confirmation button, and a denial button in its display module.

Optionally, after the electronic cigarette displays a first reminder message in its display module for prompting the user to confirm whether to control the output of the atomizer according to the target power, the electronic cigarette controls the atomizer output at the target power according to the cigarette lighting signal when it detects that the confirmation output condition is satisfied.

For example, when detecting that the confirmation button is triggered, the electronic cigarette controls the atomizer to output at the target power according to the cigarette lighting signal. For another example, the electronic cigarette does not detect that the denial button is triggered within a preset time period after displaying the first reminder message, and controls the atomizer to output at the target power according to the cigarette lighting signal.

Optionally, after the electronic cigarette displays a first reminder message on its display module for prompting the user to confirm whether to control the output of the atomizer according to the target power, the electronic cigarette receives the confirmation signal for confirming that the atomizer stops outputting according to the target power, the atomizer is controlled to output at a power less than or equal to the maximum output power according to the cigarette lighting signal. The confirmation signal is generated when the user confirms that the atomizer stops outputting at the target power.

For example, when the denial button is triggered by the user, the electronic cigarette receives the confirmation signal, and controls the atomizer to output at a power less than or equal to the maximum output power according to the cigarette lighting signal.

For the implementation of controlling the atomizer at the power output less than or equal to the maximum output power according to the cigarette lighting signal, can refer to the implementation of step 230 to control the atomizer according to the smoke signal to output the power output less than or equal to the maximum output power.

In an example, the specific implementation of controlling the atomizer according to the cigarette lighting signal to output power less than or equal to the maximum output power may also be: obtaining the output power inputted by the user as the target power; when the target power is less than the maximum output power during the secure output, the atomizer is controlled to output according to the target power according to the cigarette lighting signal.

The electronic cigarette can directly obtain the output power inputted by the user, and can also receive the output power inputted by the user sent by the electronic device.

In one example, when the electronic cigarette has its power limitation function turned on, the electronic cigarette can perform several steps as shown in FIG. 2; when the electronic cigarette has its power limitation function turned off, it does not adjust the output power of the atomizer according to the atomizer's the power information and the resistance value information.

Optionally, the electronic cigarette can display a setting menu of the power limitation function, and the user can turn on or off the power limitation function of the electronic cigarette through the setting menu. For example, the setting menu may include a sliding button. When it is detected that the sliding button is slid to the first limit position, the electronic cigarette turns on its power limitation function; when it is detected that the sliding button is slid to the second limit position, the electronic cigarette turns off its power limitation function.

Optionally, the user can also set the corresponding maximum output power for multiple resistance value information through the setting menu. For example, the electronic cigarette provides an input box for each of the resistance value information, and stores the maximum output power inputted in the input box corresponding to the resistance value information corresponding to the input box. Any one of the plurality of resistance value information mentioned here may be the resistance value information of any atomizer on the market.

Optionally, the user can also set the display mode of the first reminder message through the setting menu. The display modes mentioned here include a text reminder mode, an alarm by an alarm device, a voice broadcast of the first reminder message, and so on. Then, when displaying the first reminder message, the electronic cigarette can be displayed according to the display mode selected in the setting menu.

In the embodiment of the present invention, the setting menu of the power limitation function provided by the electronic cigarette is used as an example for illustration. In actual implementation, the setting menu may be provided by the electronic device, and the electronic device may send a notification message to notify the electronic cigarette to turn on or turn off the power limitation function, and the electronic device sends the maximum output power corresponding to each resistance value information and set by the user to the electronic cigarette, and the electronic device sends the display mode of the first reminder message set by the user to the electronic cigarette.

In one example, a liquid level detector is provided in the atomizer, and the liquid level detector is used to detect the liquid level value of the liquid in the atomizer. The liquid level detector may be either one of a resistance type, a microwave type, a laser type, an ultrasonic type, a photoelectric type, a thermoelectric type, an inductive, a capacitive type, an electromagnetic type, a piezoelectric type, an optical fiber type or a nuclear radiation type.

When the liquid in the atomizer is too little, dry burning is easy to occur. In order to avoid dry burning, when the liquid level detector detects that the liquid level value of the liquid in the atomizer is lower than a preset threshold, the electronic cigarette reduces the output power of the atomizer according to the liquid level value.

Among them, reducing the output power of the atomizer according to the liquid level value can be achieved in the following ways:

First, when the electronic cigarette receives the cigarette lighting signal, controls the atomizer to output the output power corresponding to the liquid level value detected by the liquid level detector. Among them, the liquid level value is positively correlated with its corresponding output power, so that after the liquid level value of the liquid in the atomizer is lower than the preset threshold, the amount of smoke generated by the atomizer gradually decreases as the liquid in the atomizer is consumed, to remind the user that the liquid in the atomizer is almost consumed and add liquid to the atomizer as soon as possible to avoid the atomizer from burning dry. The corresponding relationship between the liquid level value and the output power may be a corresponding relationship table or a relationship curve.

Second, when the electronic cigarette receives the cigarette lighting signal, it controls the atomizer to output according to a predetermined output power, which can be set by a system developer or can be customized by the user. For example, the system developer may have heard many experiments to determine the output power of the atomizer when the atomizer produces small smoke, and determine the output power as the predetermined output power.

In one example, the electronic cigarette also obtains the temperature of the heating component in the atomizer, and determines the consumption rate of the liquid in the atomizer according to the temperature of the heating component; when the consumption rate is greater than the maximum liquid absorption rate of the liquid-absorbing member in the atomizer, reduces the output power of the atomizer or control the atomizer to stop working.

Optionally, the realization of the electronic cigarette determining the consumption rate of the liquid in the atomizer according to the temperature of the heating component may be: obtaining the consumption rate of the liquid in the atomizer corresponding to the heating component, the temperature of the heating component and the consumption rate of the liquid in the atomizer is positively correlated. The correspondence between the temperature of the heating component and the consumption rate of the liquid in the atomizer is stored in the electronic cigarette, and may be a correspondence table or a relation curve.

The electronic cigarette can obtain the maximum liquid absorption rate of the liquid-absorbing member in the atomizer by: 1. Obtaining the maximum liquid absorption rate of the liquid-absorbing member in the atomizer sent by the atomizer; 2. Obtaining the maximum liquid absorption rate of the liquid-absorbing member in the atomizer inputted by the user.

In one example, when the liquid level detector detects that the liquid level value of the liquid in the atomizer is lower than a preset threshold, the consumption rate of the liquid in the atomizer is determined according to the output power of the atomizer; calculating safe working duration based on the liquid level value and the consumption rate, and displaying a second reminder message carrying the safe working duration.

The realization of the electronic cigarette determining the consumption rate of the liquid in the atomizer according to the output power of the atomizer may be: obtaining the consumption rate corresponding to the output power of the atomizer, and the output power is positively correlated with the consumption rate. The correspondence between the output power of the atomizer and the consumption rate of the liquid in the atomizer is stored in the electronic cigarette, and may be a correspondence table or a relationship curve.

For the manner of displaying the second reminder message, please refer to the manner of displaying the first reminder message, which will not be repeated here. By displaying the second prompt message, the user can inject liquid into the atomizer within the safe working time or replace the atomizer within the safe working time.

An embodiment of the present invention also provides a control device including a memory and a processor; the memory stores at least one program instruction; the processor implements the control method involved in the embodiment by loading and executing at least one program instruction.

An embodiment of the present invention also provides an electronic cigarette. The electronic cigarette includes the control device described in the foregoing embodiment.

An embodiment of the present invention also provides a computer-readable storage medium in which one or more instructions are stored, when the one or more instructions are executed by a control component in the electronic cigarette, the control method according to any of the above embodiments is implemented.

The sequence numbers of the above embodiments of the present invention are for description only, and do not represent the advantages and disadvantages of the embodiments.

A person of ordinary skill in the art may understand that all or part of the steps for implementing the above-described embodiments may be completed by hardware, or may be completed by a program instructing related hardware. The program may be stored in a computer-readable storage medium. The mentioned storage medium may be a read-only memory, a magnetic disk or an optical disk, etc.

The above are only preferred embodiments of the present invention and are not intended to limit the present invention. Any modification, equivalent replacement, improvement, etc. within the spirit and principle of the present invention should be included in the protection of the present invention Within range.

What is claimed is:

1. A control method, wherein the method comprises:
    obtaining a maximum output power of an atomizer connected to a body during a secure output;
    detecting whether a currently-set target power of the atomizer is higher than the maximum output power;
    when the target power is higher than the maximum output power, executing a preset operation, the preset operation comprising at least one of controlling the atomizer to output at power less than or equal to the maximum output power according to a cigarette lighting signal, and displaying a first reminder message;
    wherein the method further comprises:
    when a liquid level detector detects that a liquid level value of liquid in the atomizer is lower than a preset threshold, determining a consumption rate of the liquid in the atomizer according to the output power of the atomizer;
    calculating safe working duration based on the liquid level value and the consumption rate, and displaying a second reminder message carrying the safe working duration.

2. The method according to claim 1, wherein the obtaining the maximum output power of an atomizer connected to a body during a secure output comprises:
    obtaining resistance value information of the atomizer;
    obtaining the maximum output power of the atomizer during a secure output according to the resistance value information.

3. The method according to claim 2, wherein the obtaining the maximum output power of the atomizer during a secure output according to the resistance value information comprises:
    querying the maximum output power corresponding to the resistance value information, according to a preset correspondence relationship between the resistance value and the maximum output power.

4. The method according to claim 3, wherein the method further comprises:
    receiving an adjustment instruction for adjusting the maximum output power corresponding to target resistance value;
    adjusting the maximum output power corresponding to the target resistance value of the preset correspondence relationship according to the adjustment instruction.

5. The method according to claim 1, wherein the method comprises:
    when the power information of the atomizer is less than or equal to the maximum output power, controlling the atomizer output at the target power according to the cigarette lighting signal.

6. The method according to claim 1, wherein the executing a preset operation comprises:
    displaying the first reminder message, the first reminder message used to prompt whether the atomizer outputs at the target power;
    when a confirmation output condition is satisfied, the atomizer controlled to output at the target power according to the cigarette lighting signal.

7. The method according to claim 1, wherein the executing a preset operation comprises:
    displaying the first reminder message, the first reminder message used to prompt whether the atomizer outputs at the target power;
    when receiving a confirmation signal, the atomizer controlled to output at a power less than or equal to the maximum output power according to the cigarette lighting signal, and the confirmation signal generated when the atomizer stops outputting at the target power is confirmed.

8. The method according to claim 1, wherein the controlling the atomizer to output at power less than or equal to the maximum output power according to the cigarette lighting signal comprises:

obtaining output power inputted by a user, controlling the atomizer to output according to the output power inputted by the user according to the cigarette lighting signal; or, obtaining a recommended output power, and controlling the atomizer output at the recommended output power according to the cigarette lighting signal, the recommended output power determined according to historical output power of the electronic cigarette; or, when the cigarette lighting signal is received, the atomizer controlled to stop working.

9. The method according to claim 1, wherein the method further comprises:

when the liquid level detector detects that the liquid level value of the liquid in the atomizer is lower than the preset threshold, reducing the output power of the atomizer according to the liquid level value.

10. The method according to claim 1, wherein the method further comprises:

obtaining a temperature of a heating component in the atomizer, and determining consumption rate of the liquid in the atomizer according to the temperature of the heating component;

when the consumption rate is greater than the maximum liquid absorption rate of the liquid-absorbing member in the atomizer, reducing the output power of the atomizer or controlling the atomizer to stop working.

11. The method according to claim 1, wherein before executing a preset operation, the method further comprises:

receiving a setting instruction for setting a reminder mode of the first reminder message;

the executing a preset operation comprises: displaying the first reminder message according to the reminder mode set by the setting instruction.

* * * * *